(12) United States Patent
Clarke et al.

(10) Patent No.: US 7,310,879 B1
(45) Date of Patent: Dec. 25, 2007

(54) CUTTING ATTACHMENT HAVING AN ADJUSTABLE FOOT FOR ROTARY HAND TOOLS

(75) Inventors: David A. Clarke, Chicago, IL (US); Garth W. Prince, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/494,119

(22) Filed: Jul. 27, 2006

(51) Int. Cl.
*B25F 3/00* (2006.01)
(52) U.S. Cl. .............................. 30/122; 30/123; 30/391; 451/451
(58) Field of Classification Search ................. 30/390, 30/391, 388, 122, 123; 451/358, 359, 451, 451/452
See application file for complete search history.

(56) References Cited

U.S. PATENT DOCUMENTS

| | | | |
|---|---|---|---|
| 1,378,258 A | 5/1921 | Manderfield | |
| 1,806,582 A | 5/1931 | Beutner | |
| 2,248,694 A | 7/1941 | Boyette | |
| 2,517,910 A * | 8/1950 | Miller | 74/325 |
| 2,532,982 A | 12/1950 | Young | |
| 2,553,688 A * | 5/1951 | Thompson | 451/344 |
| 2,610,658 A | 9/1952 | Koelling | |
| 2,705,513 A | 4/1955 | Moeller | |
| 2,741,282 A | 4/1956 | Wieting | |
| 3,111,969 A | 11/1963 | Bivens | |
| 3,177,909 A | 4/1965 | Laube et al. | |
| 3,466,973 A | 9/1969 | Rees | |
| 3,613,748 A | 10/1971 | De Pue | |
| 3,711,998 A | 1/1973 | Mason | |
| 3,716,917 A | 2/1973 | Ruben | |
| 3,730,239 A | 5/1973 | Kaman et al. | |
| 3,805,639 A | 4/1974 | Peter | |
| 3,873,862 A | 3/1975 | Butler | |
| 4,010,670 A | 3/1977 | Lejdegard | |
| 4,022,182 A | 5/1977 | Lenkevich | |

(Continued)

OTHER PUBLICATIONS

Torx Drive System, 2001, pp. 1-8, Rockford, Illinois.

(Continued)

*Primary Examiner*—Timothy V. Eley
(74) *Attorney, Agent, or Firm*—Greer, Burns & Crain, Ltd

(57) ABSTRACT

Embodiments of an accessory attachment for a rotary power hand tool are disclosed wherein the hand tool is of the type which has a tool housing with a preferably cylindrical nose portion, a motor having a motor drive shaft with a mounting coupling extending forwardly from the nose portion for receiving a drive shaft, the attachment comprising a housing having a first end portion configured to be mounted to the tool housing nose portion and an input shaft for coupling to the motor drive shaft, and having an enlarged second end portion oriented at a right angle relative to the first end portion and also having an output shaft coupled to the input shaft at a right angle relative thereto, a rotary cutting wheel mounted to the output shaft and substantially disposed within said enlarged second end portion, excepting an exposed portion of the rotary cutting wheel for engaging a work surface, an adjustable guide foot pivotally connected to the enlarged second end portion and having a front surface configured to abut the work surface, the guide foot being configured to permit the wheel to extend beyond the front surface, where a position of the guide foot limits a depth of cut of the wheel into the work surface.

18 Claims, 7 Drawing Sheets

U.S. PATENT DOCUMENTS

| | | | |
|---|---|---|---|
| 4,241,505 A | 12/1980 | Bodycomb, Jr. et al. | |
| 4,318,224 A | 3/1982 | Getts | |
| 4,324,163 A | 4/1982 | LaVelle | |
| 4,353,165 A | 10/1982 | Albery | |
| 4,414,743 A | 11/1983 | Pioch et al. | |
| 4,450,627 A | 5/1984 | Morimoto | |
| 4,516,324 A | 5/1985 | Heininger, Jr. et al. | |
| 4,545,121 A | 10/1985 | Armbruster et al. | |
| 4,555,849 A | 12/1985 | Ando et al. | |
| 4,589,208 A | 5/1986 | Iwasaki et al. | |
| 4,627,774 A | 12/1986 | Bradley | |
| 4,633,621 A * | 1/1987 | Weber | 451/461 |
| 4,649,644 A * | 3/1987 | Huddleston | 30/122 |
| 4,739,745 A | 4/1988 | Browning | |
| 4,856,394 A | 8/1989 | Clowers | |
| 4,889,025 A | 12/1989 | Collett | |
| 4,972,588 A | 11/1990 | Briach, Sr. | |
| 4,972,589 A * | 11/1990 | Povleski | 30/500 |
| 4,979,307 A | 12/1990 | Ste. Marie | |
| 5,005,295 A | 4/1991 | Fushiya | |
| 5,012,582 A | 5/1991 | Bristol et al. | |
| 5,023,999 A | 6/1991 | Looper et al. | |
| 5,084,972 A | 2/1992 | Waugh | |
| 5,327,649 A | 7/1994 | Skinner | |
| 5,430,944 A | 7/1995 | Shilling | |
| 5,439,413 A | 8/1995 | Lagler | |
| 5,531,147 A | 7/1996 | Serban | |
| 5,537,748 A | 7/1996 | Takahashi et al. | |
| 5,542,183 A | 8/1996 | Allison | |
| 5,637,035 A | 6/1997 | Yee | |
| 5,657,804 A | 8/1997 | Lee | |
| 5,675,895 A | 10/1997 | Mori et al. | |
| 5,730,561 A * | 3/1998 | Wambeke | 408/118 |
| 5,784,789 A | 7/1998 | Vargas | |
| 5,815,932 A | 10/1998 | Presher et al. | |
| 5,881,784 A | 3/1999 | Morikawa et al. | |
| 5,947,805 A | 9/1999 | Van Osenbruggen | |
| 5,974,674 A | 11/1999 | Kelly | |
| 5,988,240 A | 11/1999 | Markus | |
| 6,021,826 A | 2/2000 | Daniell | |
| 6,042,311 A | 3/2000 | Yokoyama et al. | |
| 6,048,260 A * | 4/2000 | Kopras | 451/358 |
| 6,260,274 B1 * | 7/2001 | Kane et al. | 30/122 |
| 6,260,591 B1 | 7/2001 | George et al. | |
| 6,280,309 B1 | 8/2001 | Van Osenbruggen | |
| 6,298,762 B1 | 10/2001 | LaRue et al. | |
| 6,449,852 B1 | 9/2002 | Simantel | |
| 6,588,111 B2 | 7/2003 | Williams | |
| 6,622,762 B2 | 9/2003 | Bergner et al. | |
| 6,625,891 B2 | 9/2003 | Stielper | |
| 6,676,347 B2 | 1/2004 | Jensen | |
| 6,678,960 B2 | 1/2004 | Williams | |
| 6,755,597 B2 | 6/2004 | Bergner et al. | |
| 6,757,982 B2 | 7/2004 | Refson | |
| 6,767,198 B2 | 7/2004 | Weinstein et al. | |
| 6,826,992 B1 | 12/2004 | Huang | |
| 6,866,568 B2 | 3/2005 | Liao | |
| 6,868,757 B2 | 3/2005 | Hufnagle et al. | |
| 6,874,493 B2 | 4/2005 | Glenn | |
| 6,877,410 B2 | 4/2005 | Gass et al. | |
| 6,898,854 B2 * | 5/2005 | Zemlok et al. | 30/122 |
| 6,915,796 B2 | 7/2005 | Sung | |
| 6,920,814 B2 | 7/2005 | Gass et al. | |
| 6,935,940 B2 | 8/2005 | Skeem et al. | |
| 6,978,548 B2 | 12/2005 | Whited et al. | |
| 6,997,085 B2 | 2/2006 | Yamamoto | |
| 7,000,523 B2 | 2/2006 | Mori et al. | |
| 7,014,403 B1 | 3/2006 | Higganbotham et al. | |
| 7,017,677 B2 | 3/2006 | Keshavan et al. | |
| 7,021,399 B2 | 4/2006 | Driessen | |
| 7,033,258 B2 | 4/2006 | Jordan | |
| 7,044,701 B2 | 5/2006 | Herb | |
| 7,047,585 B2 | 5/2006 | Bayer et al. | |
| 7,051,624 B2 | 5/2006 | Oleszek | |
| 7,052,382 B2 * | 5/2006 | Baker | 451/344 |
| 7,077,736 B2 * | 7/2006 | Uzumcu et al. | 451/359 |
| 2005/0048884 A1 * | 3/2005 | Baker | 451/358 |
| 2005/0155233 A1 | 7/2005 | Chen | |

OTHER PUBLICATIONS

Right Mounting for Safe Grinding, Predating Filing Date, pp. 1-7.

* cited by examiner

CUTTING ATTACHMENT HAVING AN ADJUSTABLE FOOT FOR ROTARY HAND TOOLS

CROSS REFERENCE TO RELATED APPLICATIONS

This application is related to CUTTING ATTACHMENT WITH A REMOVABLE COVER FOR ROTARY HAND TOOLS, by David Clarke and Garth W. Prince, filed on even date herewith and given Ser. No. 11/494,117, which is specifically incorporated by reference herein.

BACKGROUND OF THE INVENTION

The present invention relates to small rotary hand tools, and more specifically to cutting attachments for such rotary hand tools.

Undercut saws, or flush cut "jamb" saws, are used to trim door jambs, baseboards and the like, to provide sufficient room to install materials, such as wood flooring, carpeting and tile, underneath the jambs and baseboards. There are many undercut saws on the market, but all known saws are dedicated tools, in that they have few uses other than making the flush cuts for which they were designed. While this exclusive use is welcomed by artisans who use undercut saws on a regular basis and who want a tool that is rugged and dependable, there are many woodworkers and occasional users that would welcome having a tool with multiple uses, including performing flush cuts.

Small rotary hand tools of the type that are marketed under the Dremel® and Roto-Zip® brands, for example, typically include a generally cylindrical housing that encloses only a motor with a rotary output shaft extending from the nose end and a nose portion that is configured to connect to various accessories or attachments. This simplicity affords tremendous versatility, because it is capable of performing a multitude of additional tasks depending on the particular accessory attachment that is attached to the tool.

Additionally, there has been continued innovation and improvement in the design of accessories for such hand tools, particularly with regard to the attachment of accessories that promote a particular, specialized function of the rotary hand tool.

SUMMARY OF THE INVENTION

Embodiments of an accessory attachment for a rotary power hand tool are disclosed wherein the hand tool is of the type which has a tool housing with a substantially cylindrical nose portion, a motor having a motor drive shaft with a mounting coupling extending forwardly from the nose portion for receiving a drive shaft, the attachment including a housing having a first end portion configured to be mounted to the tool housing nose portion and an input shaft for coupling to the motor drive shaft, and having an enlarged second end portion oriented at a right angle relative to the first end portion and also having an output shaft coupled to the input shaft at a right angle relative thereto, a rotary cutting wheel mounted to the output shaft and substantially disposed within the enlarged second end portion, excepting an exposed portion of the rotary cutting wheel for engaging a work surface, an adjustable guide foot pivotally connected to the enlarged second end portion and having a front surface configured to abut the work surface, the guide foot being configured to permit the wheel to extend beyond the front surface, where a position of the guide foot limits a depth of cut of the wheel into the work surface.

DETAILED DESCRIPTION OF THE INVENTION

Figure 1:
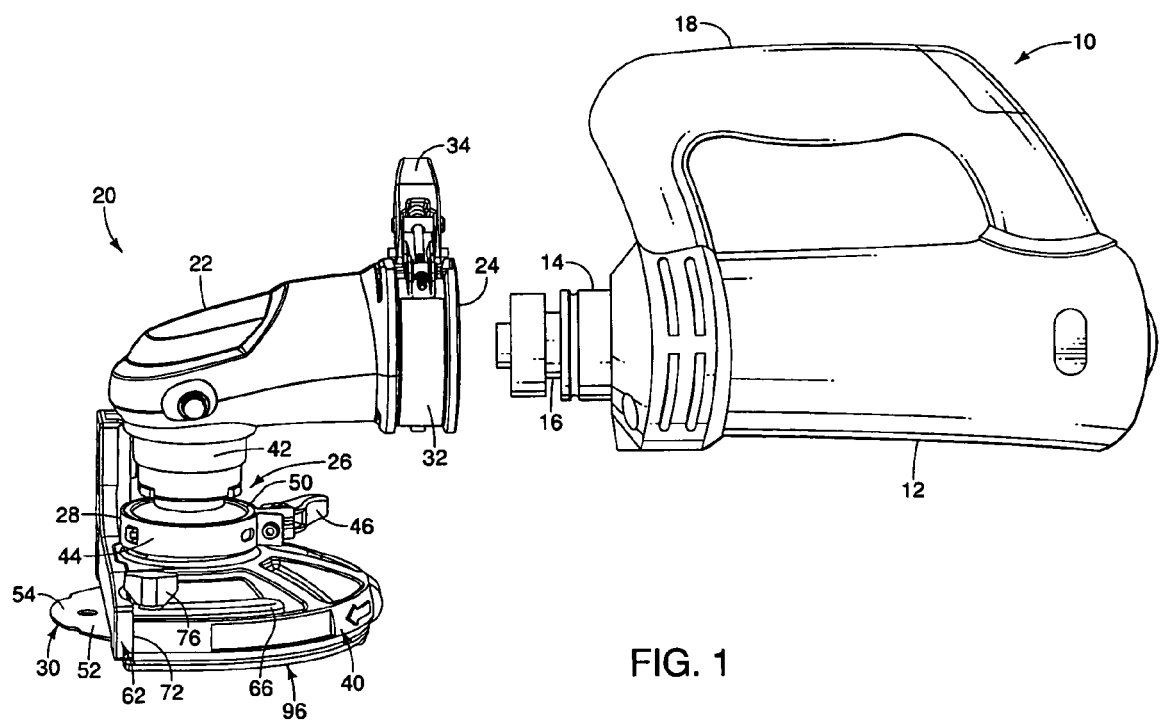
FIG. 1 is a side elevational view of a preferred accessory cutting attachment with an exemplary rotary hand tool.
Figure 2:
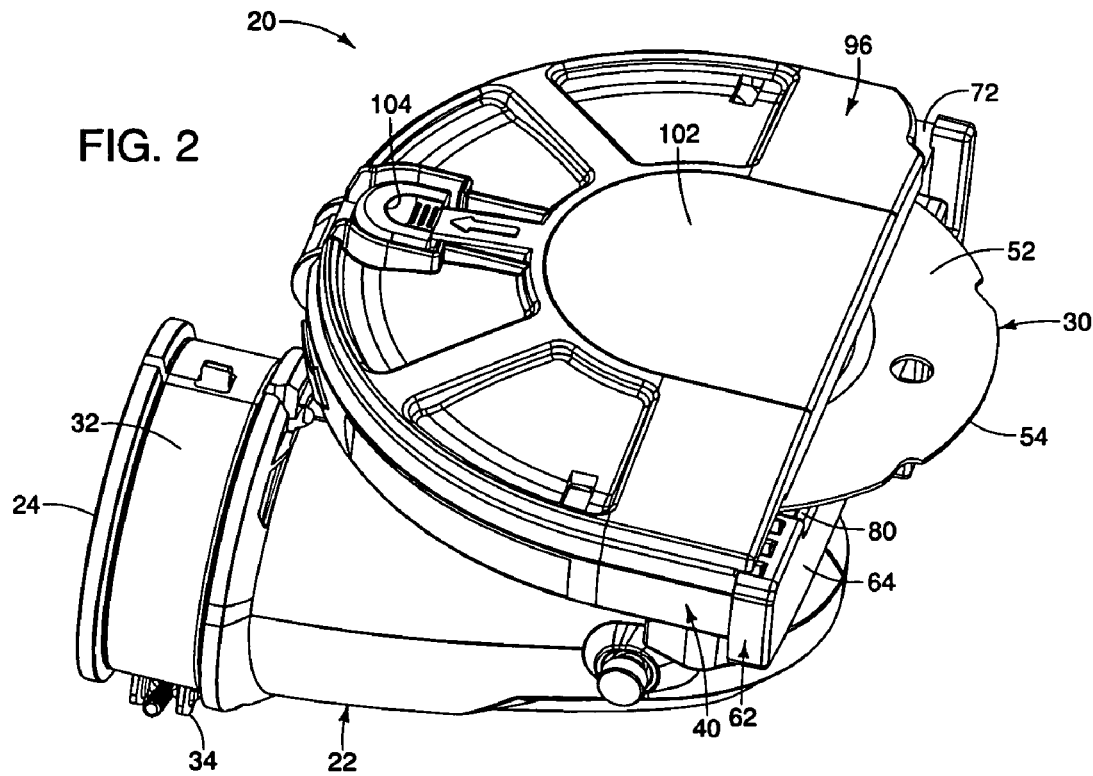
FIG. 2 is a bottom perspective view of the accessory cutting attachment of FIG. 1.
Figure 3:
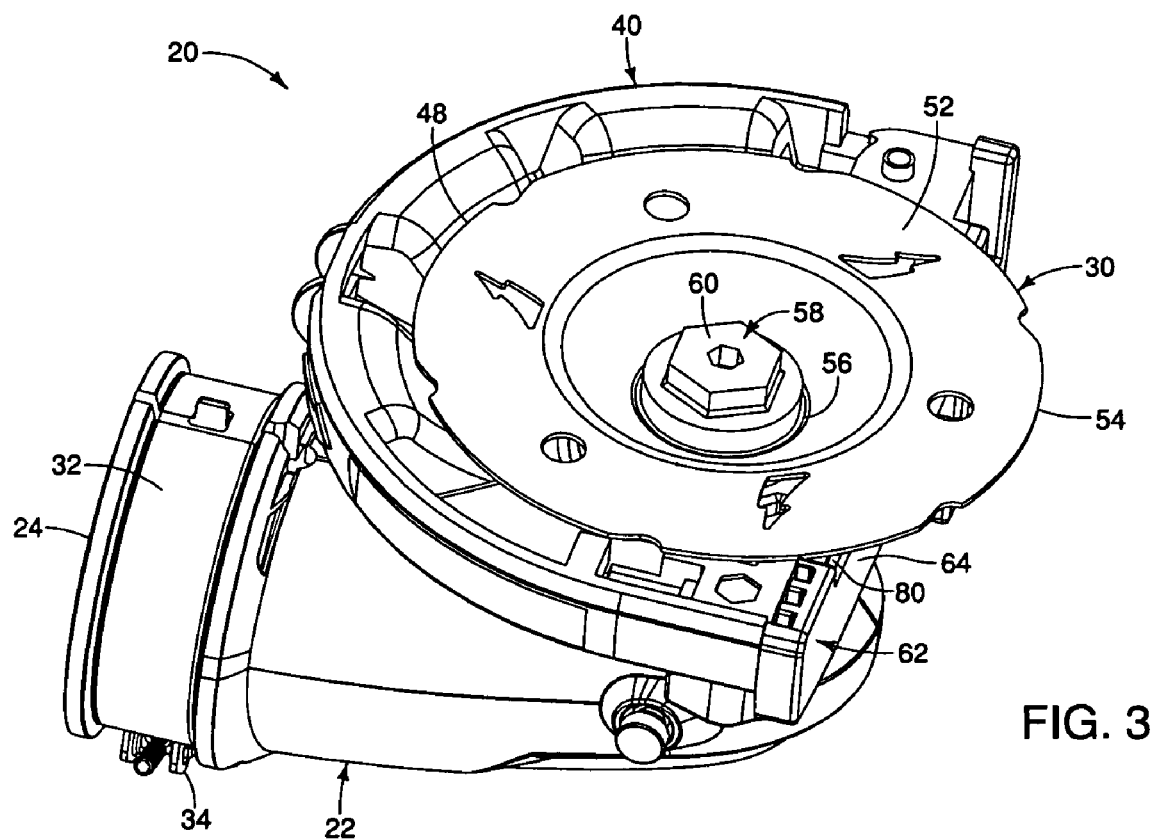
FIG. 3 is a bottom perspective view of the accessory cutting attachment of FIG. 1 without the optional cover.
Figure 4:
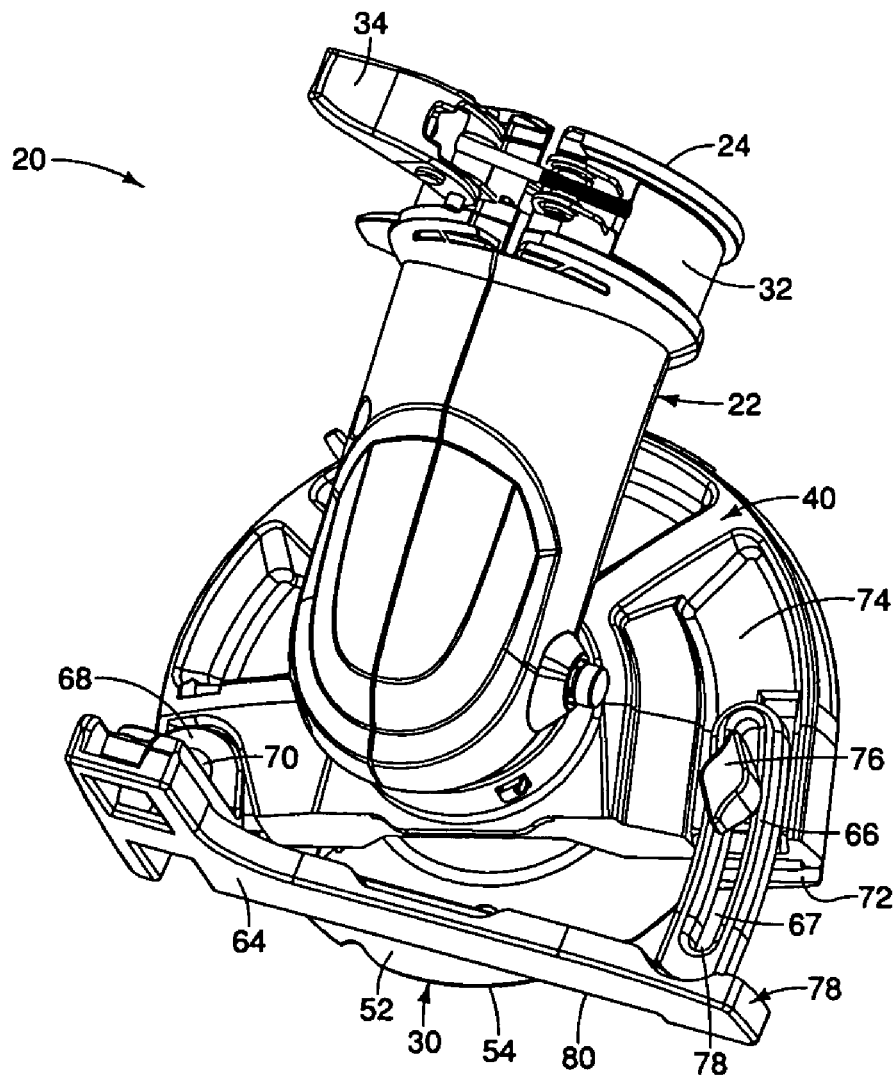
FIG. 4 is a top perspective view of the accessory cutting attachment illustrated in FIG. 1.

Embodiments of the invention include an accessory cutting attachment for a rotary hand tool that promotes a variety of cutting applications. While it is contemplated that the accessory cutting attachment may include mounting features configured to engage a variety of rotary hand tools, FIG. 1 illustrates an exemplary rotary hand tool, designated generally at 10, to which the preferred embodiment of the attachment may be coupled. For example, the rotary hand tool 10 may be of the type as those marketed under the Dremel® and Roto-Zip® brands made by the Robert Bosch Tool Corporation of Mount Prospect, Ill.

Generally, as illustrated in FIG. 1, the rotary hand tool 10 is a powered rotary hand tool of the type that includes a generally cylindrical housing 12 preferably made of a rugged, impact resistant plastic material and having a substantially cylindrical nose portion 14. Enclosed within the housing 12 is a motor (not shown) that drives a motor output shaft 16 that extends through and from the nose portion 14. A detachable handle 18 is also optionally provided with the hand tool 10.

FIGS. 1-7 illustrate an accessory cutting attachment, designated generally at 20, according to a preferred embodiment of the invention. The preferred cutting attachment 20 includes features promoting coupling of the cutting attachment with the rotary hand tool 10. Advantageously, the preferred cutting attachment 20 also includes a variety of features enabling a user to perform a multitude of cutting applications. For example, when coupled to the rotary hand tool 10, the preferred cutting attachment 20 may be used for various undercutting applications, including door jamb cutting, as well as trim and base board cutting for a predetermined adjustable depth, for example as much as approximately ¾ inch. Additionally, the preferred cutting attachment 20 includes features that promote use of the cutting attachment as a circular saw when used in a vertical or other angled orientation.

More particularly, the preferred accessory cutting attachment 20 includes an attachment housing, designated generally at 22, having a coupling end 24 configured to couple with the rotary hand tool 10, and an enlarged cutting end, indicated generally at 26, disposed at a generally right angle to the coupling end 24.

Figure 7:
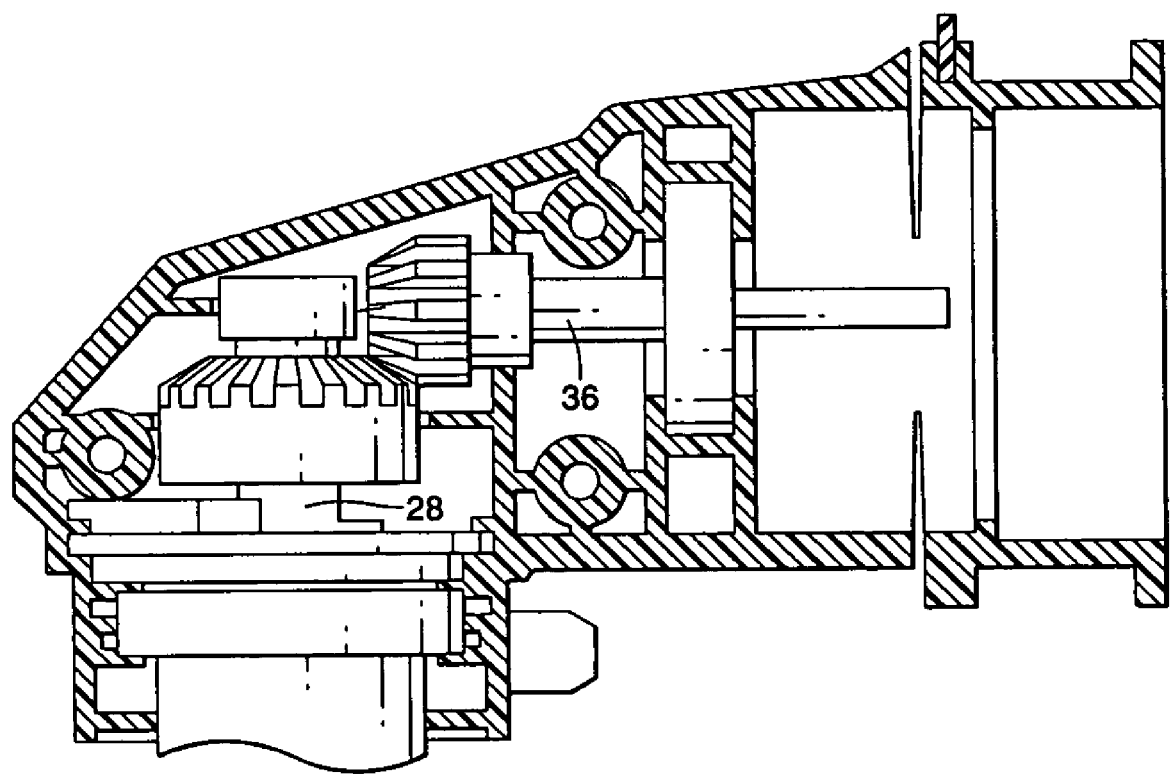
FIG. 7 is a cross section of a portion of the attachment illustrated in FIG. 1, showing the input and output shafts.

The attachment housing 22 is preferably composed of a rugged, impact resistant plastic material and having an output shaft 28 and an input shaft 36 that are interconnected by gears as shown in FIG. 7. The output shaft 28 is configured to drive a rotating tool, such as a rotary saw wheel or blade, indicated generally at 30. For example, the attachment housing 22 may include nylon, ABS, or polypropylene, preferably 33% glass-filled nylon. Preferably, the cutting attachment 20 includes two halves that matingly engage one another in a clamshell engagement to form the single attachment housing 22, though it is contemplated that the attachment housing may be made of a greater or lesser number of parts.

The coupling end 24 of the attachment housing 22 is generally cylindrical in shape, and includes a generally circular opening that is sized and configured to snugly and matingly receive cylindrical nose portion 14 of the rotary hand tool 10. To maintain engagement of the attaching housing 22 to the rotary hand tool, the coupling end 24 also preferably includes a locking mechanism, such as an annular band clamp 32 disposed around an outer circumference thereof. The annular band clamp 32 also preferably includes a cam lock 34 such that the band clamp 32 may be tightened around the outer circumference of the coupling end 24 and then locked into the tightened position.

Coupling of the drive shaft 16 of the rotary hand tool 20 to the input shaft 36 of the cutting attachment 20 may be accomplished in a variety of ways. For example, a drive nut may be coupled to the motor drive shaft 16 which has a hexagonal or square opening that engages a suitable coupling on the input shaft 36 in a manner that assured non slipping rotation, but sliding decoupling when the attachment is removed from the tool 10 as is known to those of ordinary skill in the art. Alternatively, the input shaft 36 of the cutting attachment 20 may have a square or other noncircular configuration. In this manner, the rotary hand tool 10 and cutting attachment 20 are mechanically coupled, with the motor output shaft 32 of the rotary hand tool, and input shaft 36 of the cutting attachment properly aligned.

The enlarged cutting end 26 of the attachment housing 22 is preferably configured to provide a variety of tasks, such as undercutting, flush-cutting, as well as operating as a circular saw when the cutting attachment 20 is used in a vertical or other angled orientation.

To this end, the enlarged cutting end 26 of the attachment housing 22 includes a blade guard, indicated generally at 40, configured to operationally enclose a substantial portion of the rotary cutting wheel 30. While it is contemplated that the blade guard 40 may be unitary with the enlarged cutting end 26 of the attachment housing 22, for purposes of illustration, the blade guard is shown and described as being releasably secured to a nose portion 42 of the enlarged cutting end, such as via a band clamp 44 and cam lock 46. It is further contemplated that alternative locking mechanisms, such as a snap-fit or frictional engagement, may be provided in place of the band clamp 44 and cam lock 46 without departing from the scope of the invention.

The blade guard 40 is preferably bowl-shaped, with a concave portion 48 for containing the rotary cutting wheel 30 therein. A generally ring-shaped collar 50 extends upwardly from a surface of the blade guard 40 opposite the receiving portion to engage the nose portion 44 of the enlarged cutting end 26, and it is around this collar 50 that the band clamp 44 and cam lock 46 are preferably secured to releasably secure the blade guard to the enlarged cutting end.

The rotary cutting wheel 30 is dome-shaped, having a preferably smooth, but segmented annular flange 52 disposed around an outer circumference thereof and having a cutting edge 54. The rotary cutting wheel 30 is designed to cut through wood and small nails, and is preferably a segmented abrasive wheel having tungsten carbide bonded to its perimeter surface, but not on either face.

The rotary cutting wheel has an offset center hub portion 56, which allows a mounting flange 58 having a preferably integral hexagonal nut portion 60 to be recessed in the rotary cutting wheel. The configuration of the rotary cutting wheel 30 enables the attachment 20 to make flush cuts in a work surface.

It is contemplated that the cutting attachment 20 may be operated at any angle between those designations known to those skilled in the art as "vertical" and "horizontal," where "horizontal" refers to operation of the cutting attachment during undercutting and flush cutting applications where the cutting plane of the wheel is horizontal and the wheel is flush cutting a vertical surface such as a baseboard of a wall, for example. Vertical then means the cutting plane of the wheel is generally perpendicular to a horizontal surface.

The preferred cutting attachment 20 also preferably includes additional features to promote depth of cut adjustment, such as a pivoting foot, designated generally at 62. Advantageously, the preferred pivoting foot 62 promotes a smooth, easy and user-friendly mechanism to determine and maintain a desired depth of cut. The pivoting foot 62 is preferably configured to be pivotably coupled to the blade guard 40 to permit the user to determine and maintain the desired depth of cut.

As illustrated in FIGS. 1-6, the pivoting foot 62 is preferably an elongated member 64 having an elongated extension 66 extending from one end thereof, with the extension having a curved slot 67. At an end of the elongated member 64 opposite the one end having the elongated extension 66, a mounting bracket 68 is provided to fixedly couple the pivoting foot 62 to the blade guard 40. The mounting bracket 68 is secured to the blade guard 40 via a fastener 70, which may include a variety of fasteners, such as a shoulder rivet, a plain rivet with a shaft retainer, a threaded connection or any number of cylindrical-type fasteners, to name a few. The fastener 70 securing the mounting bracket 68 to the blade guard 40 serves as a pivoting point for the pivoting foot 62, whereas the elongated extension 66 is configured to be selectively moveable with respect to the blade guard. By selectively pivoting the pivoting foot 62 about the pivot point defined by the mounting bracket 68, a user may determine the desired cutting depth.

More particularly, at maximum depth of cut, the elongated member 64 is configured to be generally parallel to a generally squared end 72 of the blade guard 40. The blade guard 40 preferably includes a curved channel 74 that is correspondingly configured to promote sliding reciprocation of the elongated extension 66 therein, where the elongated extension may be removably secured into a desired position via engagement of a wing nut 76 or other fastener at a particular position along a length of the curved slot 67. It should be understood that the wing nut 76 can be a bolt with a wing configuration with the bolt being screwed into a nut structure secured in the blade guard 40, or a threaded bolt may be secure in the blade guard 40 and extend through the slot 67 and a wing nut 76 can be screwed onto the bolt. In either configuration, the size of the wing nut should be sufficient so that when it is tightened, it will engage the extension 66 and hold it in place. At the maximum depth of cut position, the elongated extension 66 will have the wing nut 76 at the extreme lower end 78 of the curved slot 67.

The wing nut 76 may be loosened or removed to permit reciprocation of the slot extension 66 relative to the wing nut and the curved channel 74 until the pivoting foot 62 is placed in the desired position to obtain the desired depth of cut. The wing nut 76 is then replaced and/or tightened to lockingly secure the position of the pivoting foot 62 relative the blade guard 40.

The elongated member 64 is preferably configured to have an outwardly facing planar surface that is configured at a lower edge 80 to expose the rotary cutting wheel 30. More particularly, the lower edge 80 includes an opening or aperture to permit extension of the rotary cutting wheel 30 therethrough when the pivoting foot 62 is coupled to the enlarged cutting end 26. Accordingly, as depth of cut is adjusted, increasingly larger portions of top and bottom surfaces of the rotary wheel 30 are exposed via the lower edge 80 of the elongated member 64, thereby promoting correspondingly increasingly larger depths of cut, as determined by the user.

In this manner, the pivoting foot 62 permits the user to determine and maintain a depth of cut from a range of depths, such as from 0" to a maximum of approximately ¾". Advantageously, the outwardly facing planar surface of the pivoting foot 62 may also serve as a stable and secure base during operation of the cutting attachment 20 as a vertical or otherwise angled circular saw. In other words, the cutting attachment 20 may be used as a circular saw.

The pivoting foot 62 may also be optionally configured to include a straight edge guide, indicated generally at 82, which advantageously promotes the accurate cutting of long, straight cuts when the cutting attachment 20 is used in the vertical orientation where there is a guide surface against which the edge guide can follow.

More particularly, the pivoting foot 62 may include a slotted bracket 84 in which to releasably secure the straight edge guide 82. The slotted bracket 84 is generally rectangular in shape, with a generally rectangular passage 86 therethrough.

Figure 5:
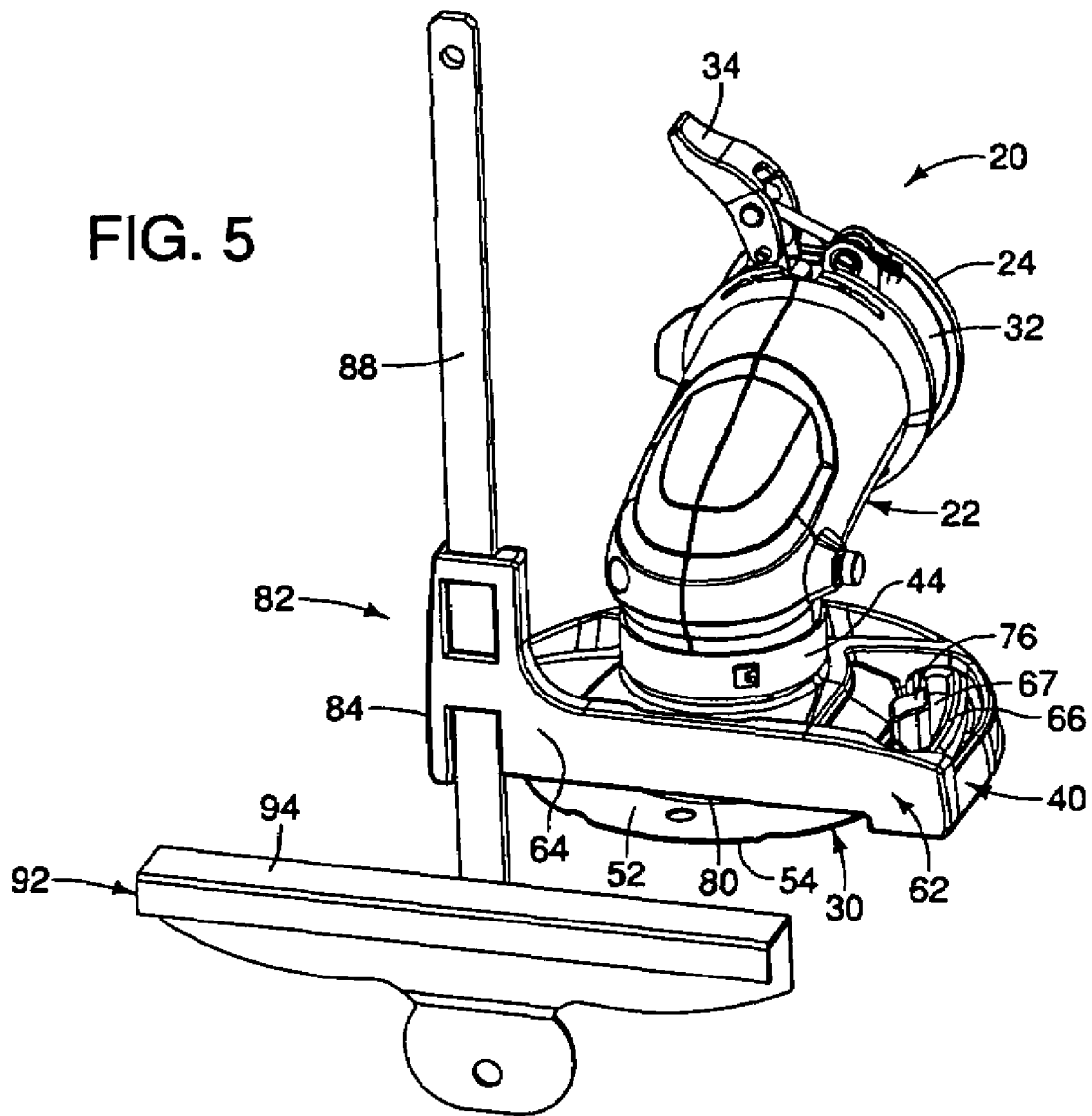
FIG. 5 is a front perspective view of the accessory cutting attachment illustrated in FIG. 1 shown with a straight edge guide.
Figure 6:
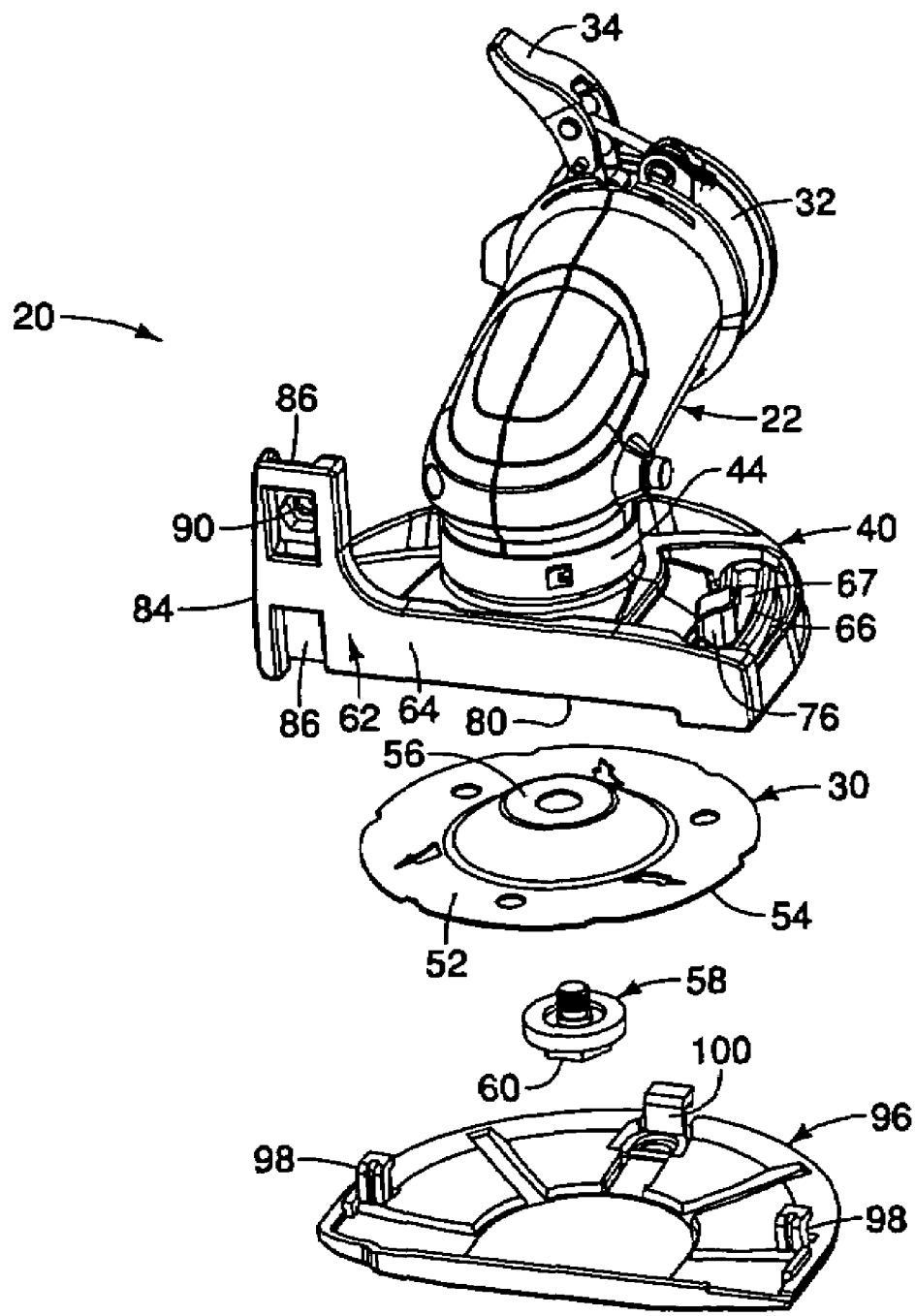
FIG. 6 is an exploded front perspective view of the accessory cutting attachment illustrated in FIG. 1.

It is contemplated that the slotted bracket 84 may be configured to receive a straight edge guide such as the straight edge guide 82 shown in FIG. 5. When provided, the straight edge guide 82 includes a generally rectangular, elongated member 88 that is configured to fit in the rectangular passage 86 of the slotted bracket 84 and be slidable with respect thereto. An orifice 90 disposed within the rectangular passage 86 is configured to receive a threaded fastener (not shown) that can be tightened when the straight edge guide 82 is properly positioned. Thus, the elongated member 88 may be slidably moved within the rectangular passage 86 until the desired position is achieved, at which point the fastener is tightened within the orifice 90 and holds the straight edge guide 82 in the desired position.

The straight edge guide 82 also preferably includes an alignment member, indicated generally at 92, for alignment with an edge of the work piece to be cut. For example, when the cutting attachment 20 is used in the vertical position, a generally planar surface 94 of the alignment member 92, which is oriented to be generally parallel with the annular flange 52, abuts the work piece to guide the rotary cutting wheel 30 in a linear cutting path parallel to the planar surface of the alignment member.

The preferred cutting attachment 20 may also optionally include a removable cover, designated generally at 96, to protect the user from injury when the cutting attachment 20 is operated in the vertical orientation. The cover, indicated generally at 96, and the blade guard 40 are configured to engage one another such that the cover and blade guard at least partially sandwich the rotary cutting wheel 30 therebetween. The preferred cover 96 includes a pair of diametrically opposed hooks 98 extending upwardly from a surface of the cover oriented to face the rotary cutting wheel 30, as well as a locking member 100 extending upwardly from the surface of the cover oriented to face the rotary cutting wheel toward an outer edge thereof, and at a position intermediate the pair of hooks 98.

In the closed position, the hooks 98 engage correspondingly configured locking orifices (not shown) disposed in the blade guard 40, and the locking member 100 releasably clamps an outer circumference of the blade guard. On an external surface 102 of the cover 96, corresponding to the location of the locking member 100, is a release button 104 which, when depressed, releases the clamping force of the locking member, thereby permitting the user to quickly and easily disengage the cover 96 from the blade guard 40.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. An accessory attachment for a rotary power hand tool of the type which has a tool housing with a nose portion, a motor having a motor drive shaft with a mounting coupling extending forwardly from the nose portion for receiving a drive shaft, said attachment comprising:
    a housing having a first end portion configured to be mounted to the tool housing nose portion and an input shaft for coupling to the motor drive shaft, said housing having an enlarged second end portion oriented at an angle relative to said first end portion and having an output shaft coupled to said input shaft at an angle relative thereto;
    a rotary cutting wheel mounted to said output shaft and substantially disposed within said enlarged second end portion, excepting an exposed portion of said rotary cutting wheel for engaging a work surface;
    an adjustable guide foot pivotally connected to said second end portion and having an elongated front surface configured to abut a work surface and extending substantially across the diameter of said wheel, said guide foot being configured to permit said wheel to extend beyond said front surface, where a position of said guide foot limits a depth of cut of said wheel into the work surface.

2. The accessory attachment of claim 1, said rotary cutting wheel further comprising a dome-shaped wheel having an annular cutting flange and a recessed hub.

3. The accessory attachment of claim 2, wherein said enlarged second end portion further comprises a correspondingly dome-shaped outer configuration and encloses a substantial portion of said rotary cutting wheel therein.

4. The accessory attachment of claim 1, said enlarged second end portion further comprises a locking member thereon, said guide foot further comprising a radial slot extension at a first end portion located adjacent one side of said wheel and a fixed pivot point disposed at a second end portion spaced from said first end portion and adjacent an opposite side of said wheel, said slot extension being configured to slidably move relative to said locking member.

5. The accessory attachment of claim 4 wherein said locking member comprises a threaded nut that is operatively engagable with said slot extension to hold said foot in a desired position.

6. The accessory attachment of claim 1, wherein said guide foot is configured to be movable relative to said enlarged second end portion to provide a range of depth of cut of from about zero inches to about ¾ inch.

7. The accessory attachment of claim 1 further comprising a straight edge guide having a straight edge guide surface that is movable relative to said guide foot and configured to guide said rotary cutting wheel in a generally linear direction at desired distances from said straight edge guide surface.

8. The accessory attachment of claim 1 further comprising a band clamp disposed around said first end portion and a cam lock that can selectively tighten said band clamp to releasably lock said first end portion to the nose portion.

9. An accessory attachment for a rotary power hand tool of the type which has a tool housing with a substantially cylindrical nose portion, a motor having a motor drive shaft with a mounting coupling extending forwardly from the nose portion for receiving a drive shaft, said attachment comprising:

an attachment housing having coupling means disposed at a first end thereof for operationally coupling said attachment to the rotary power hand tool and an enlarged second end;

rotary cutting means disposed at said enlarged second end of said housing for cutting a work surface when said attachment is operating in either a generally horizontal or vertical orientation; and an elongated adjustable depth of cut foot for adjusting a depth of cut of said rotary cutting means, said foot having a generally flat facing surface for contacting a work surface on at least opposite sides of said rotary cutting means, said foot having a pivoting connection to said enlarged second end at one end portion thereof and a locking mechanism on an opposite end portion for locking said foot in a desired position.

10. The accessory attachment of claim 9 wherein said rotary cutting means comprises a dome-shaped cutting wheel having a recessed hub and an annular flange, said annular flange having an abutment surface configured to abut the surface generally perpendicular to the work surface and a cutting edge disposed around an outer circumference of said abutment surface.

11. The accessory attachment of claim 9 further comprising straight edge guide means for guiding said rotary cutting wheel means in a linear direction.

12. The accessory attachment of claim 11 wherein said straight edge guide means is configured to be releasably secured to said adjustable depth of cut adjustment means and is moveable with respect thereto to selectively adjust a distance of said straight edge guide means from said rotary cutting wheel means.

13. The attachment of claim 9 wherein said coupling means comprises a band clamp and a cam lock configured to releasably secure said attachment housing to the rotary hand tool.

14. The attachment of claim 9 wherein said locking mechanism comprises an arcuate extension extending away from said facing surface at said opposite end portion, said extension having a slot through which a threaded member is operatively attached to said enlarged second end, selectively loosening said threaded member permitting said opposite end portion to be pivoted around said pivoting connection to adjust the relative position of said facing surface from the outer reach of said wheel.

15. The attachment of claim 14 wherein said threaded member has a wing type configuration.

16. The attachment of claim 9 wherein said foot has a vertically oriented slot for receiving a straight edge guide means for guiding said rotary cutting means in a linear direction.

17. The attachment of claim 16 wherein said slot is located at said one end portion.

18. The attachment of claim 16 wherein said one end portion of said foot has a vertical extension, at least a portion of said slot being formed in said extension to increase the stability of said straight edge guide means.

* * * * *